UNITED STATES PATENT OFFICE.

MAJOR E. HOLMES, OF LAKEWOOD, OHIO, ASSIGNOR TO NATIONAL CARBON COMPANY, OF CLEVELAND, OHIO, A CORPORATION OF NEW JERSEY.

BATTERY-DEPOLARIZER.

1,148,230.      Specification of Letters Patent.      Patented July 27, 1915.

No Drawing.      Application filed November 22, 1913. Serial No. 802,540.

*To all whom it may concern:*

Be it known that I, MAJOR E. HOLMES, a citizen of the United States, residing at Lakewood, in the county of Cuyahoga and State of Ohio, have invented a certain new and useful Improvement in Battery-Depolarizers, of which the following is a full, clear, and exact description.

This invention relates to an improvement in battery depolarizers for dry cells. In such batteries, a manganese compound in an intermediate state of oxidation is almost exclusively used, while in my invention the material to be used is in a low state of oxidation, but has, nevertheless, a large oxygen content. As is well known the former compounds are usually either the oxids or manganese-oxy-hydrogen compounds such as hydrated oxids.

My invention relates particularly to the use of a compound containing manganese, oxygen and hydrogen, which is not, however, either a hydroxid or a hydrated oxid, but is a manganese perhydrol.

The use of hydrated manganese peroxid as a depolarizer is well known to the applicant and in distinction to the use of such hydrated forms of manganese peroxid, this invention relates to the use of a perhydrol of manganese for the same purpose.

In the use of hydrated manganese peroxid, difficulty is liable to be encountered as it tends to interact with the solutions in the dry cell to liberate an acid therefrom. The acid liberated, upon permeating through the mix, will tend to produce corrosion by attacking the zinc. The depolarizer, zinc and chemicals would thus be consumed on open circuit.

The objects of my invention are to obviate this disadvantage and to secure a more efficient depolarizer.

In accomplishing this result, I make use of the manganese compound mentioned, which although identical in regard to the chemical constituents has very different physical and chemical properties. Manganese perhydrol is obtained, for example, by mixing neutral or slightly acid potassium permanganate with neutral or very slightly acid manganese sulfate at approximately the boiling temperature of the solution, in the absence of any metallic bases or salts.

The perhydrol, which may be regarded as the hydroxid with one hydrogen atom replaced by an OH radical, differs from the hydrated peroxid in that instead of having an acid reaction, it has a neutral or a weak basic reaction, and therefore, it will not liberate an acid by reacting with certain chemicals in the electrolyte of the cell.

The structural formula of the perhydrol of manganese may be illustrated by the following

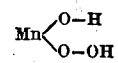

while that of the hydrated manganese peroxid is

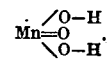

The two compounds therefore have the same chemical constituents arranged in a different manner, that is, they are isomers. The hydrate and the perhydrol specified both have the same oxygen content, but the valence of the manganese in the latter is half that of the former. It is, therefore, evident that its depolarizing action is stronger.

My invention is not to be limited to the specific perhydrol mentioned as others may also be used.

Having described my invention what I claim is:

In a dry cell, positive and negative electrodes and a depolarizing mix containing a perhydrol of manganese, having the structural formula represented by

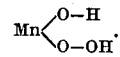

In testimony whereof, I hereunto affix my signature.

MAJOR E. HOLMES.

Witnesses:
  IRA J. ADAMS,
  H. G. GROVER.